US 8,880,214 B2

(12) United States Patent
Brown et al.

(10) Patent No.: US 8,880,214 B2
(45) Date of Patent: Nov. 4, 2014

(54) METHODS AND APPARATUS TO COMBINE MAIL STREAMS IN A BINDING LINE

(75) Inventors: Chris Brown, Forest, VA (US); David L. Drummond, Minooka, IL (US)

(73) Assignee: R.R. Donnelley & Sons Company, Chicago, IL (US)

( * ) Notice: Subject to any disclaimer, the term of this patent is extended or adjusted under 35 U.S.C. 154(b) by 2549 days.

(21) Appl. No.: 11/217,979

(22) Filed: Sep. 1, 2005

(65) Prior Publication Data

US 2007/0050081 A1    Mar. 1, 2007

(51) Int. Cl.
*G06F 7/00*    (2006.01)
*G06Q 10/08*    (2012.01)
*G07B 17/00*    (2006.01)

(52) U.S. Cl.
CPC .... G06Q 10/087 (2013.01); *G07B 2017/00483* (2013.01); *G07B 17/00467* (2013.01)
USPC ......................... 700/223; 270/56.02; 270/1.01

(58) Field of Classification Search
USPC ............ 270/1.01, 1.02, 1.03, 52.02; 700/219, 700/220, 221, 223, 224, 226, 227; 53/284.3
See application file for complete search history.

(56) References Cited

U.S. PATENT DOCUMENTS

| | | | |
|---|---|---|---|
| 6,167,326 A * | 12/2000 | Graushar et al. | 700/223 |
| 6,347,260 B1 * | 2/2002 | Graushar et al. | 700/223 |
| 6,349,260 B1 * | 2/2002 | de Jong | 701/527 |
| 6,601,847 B2 | 8/2003 | Hendrickson et al. | |
| 7,133,851 B1 * | 11/2006 | Benson | 705/410 |
| 2003/0062293 A1 | 4/2003 | Graushar et al. | |
| 2004/0172156 A1 | 9/2004 | Brown | |
| 2007/0050081 A1 * | 3/2007 | Brown et al. | 700/219 |

\* cited by examiner

*Primary Examiner* — Ramya Burgess
(74) *Attorney, Agent, or Firm* — Hanley, Flight and Zimmerman, LLC

(57) ABSTRACT

Methods, systems, and articles of manufacture to combine mail streams in a binding line are disclosed. An example method is used to create a first book on a production line, where the first book is associated with a first recipient address. The example method is then used to deposit the second book associated with a second recipient address via a book feeder on the first book as the first book moves along the production line.

24 Claims, 8 Drawing Sheets

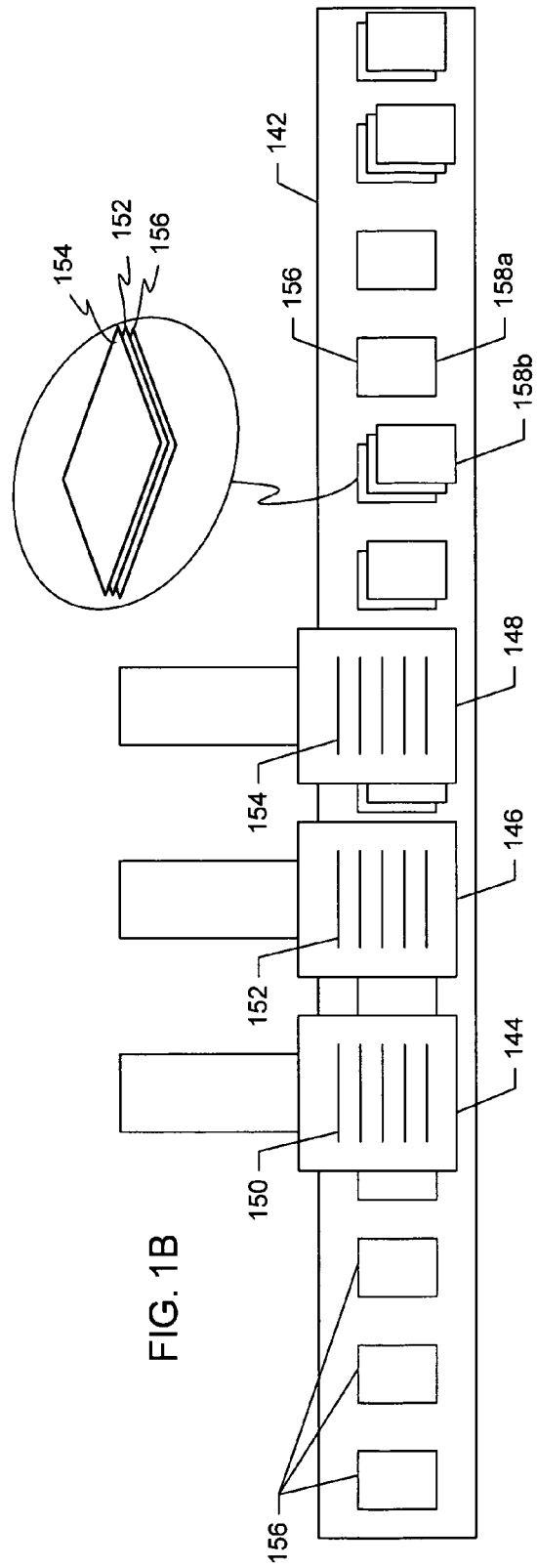
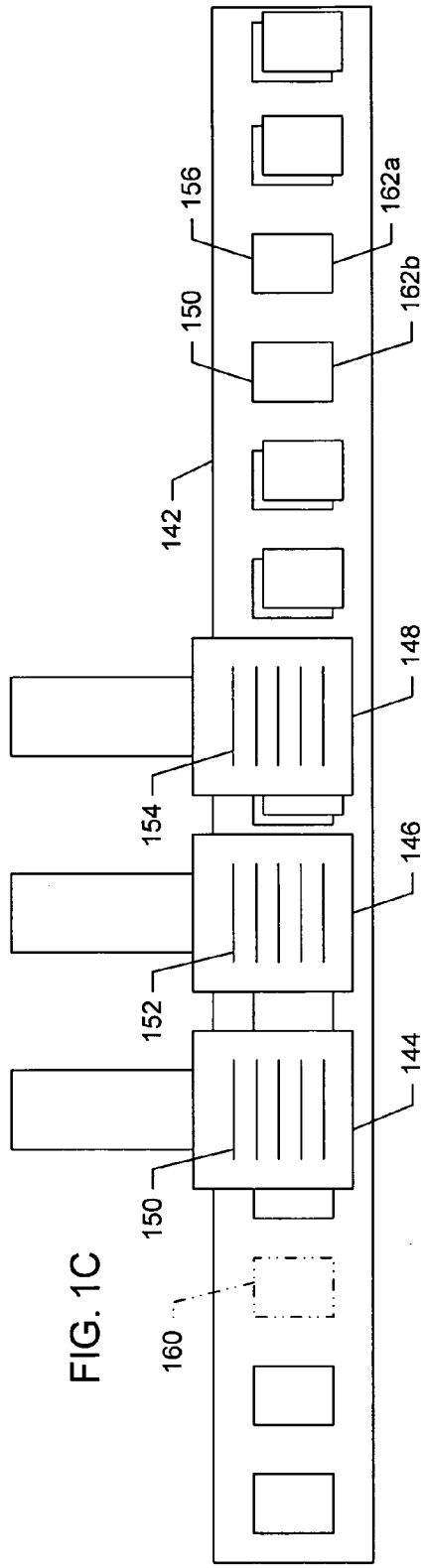

METHODS AND APPARATUS TO COMBINE MAIL STREAMS IN A BINDING LINE

TECHNICAL FIELD

The present disclosure pertains to printing systems and, more particularly to methods and apparatus to combine mail streams in a binding line.

BACKGROUND

When bulk mailings are made, significant discounts may be obtained by addressing the items to be mailed in a particular order. For example, postal discounts may be obtained by grouping all mailings destined for a particular zip code or, more generally, mailings destined for the same geographic area. Bulk mailers have long recognized the postage discounts associated with organized mailing and have typically personalized mailings so that as the mailings emerge from a printing line, the mailings are presorted.

As the bulk mailing industry has become more sophisticated, many mailers have opted to send a variety of different mailings to potential customers. The different mailing may include catalogs, flyers, etc. that have different physical configurations. For example, some mailings may include different binding styles, trim sizes, or thickness variations. Historically, however, mailings of different physical configurations are produced in separate mail streams due to equipment limitations. For example, a catalog of significant thickness may be processed on equipment different from that used to handle a mail stream of flyers of relatively less thickness. The necessity of using separate mail streams based on equipment limitations results in the loss of bulk mailing discounts that may exceed, for example, $60 per thousand pieces mailed.

Co-mailing has been used to obtain postal discounts by bundling the mailing pieces of different physical configurations. In some traditional methods, co-mailing is an off line process in which two or more complete books (e.g., catalogs, flyers, etc.) are merged together using a piece of equipment called a co-mailer. A traditional method to commingle a book with flyers and other promotional materials involves using an on-serting process. On-serting is typically used to deposit flyers or other promotional materials onto a book, all of which are intended to be delivered to the same recipient.

BRIEF DESCRIPTION OF THE DRAWINGS

FIGS. 1B and 1C are diagrams of a portion of the example book making system of FIG. 1A depicting example commingled primary and secondary books.

DETAILED DESCRIPTION

Figure 1A:
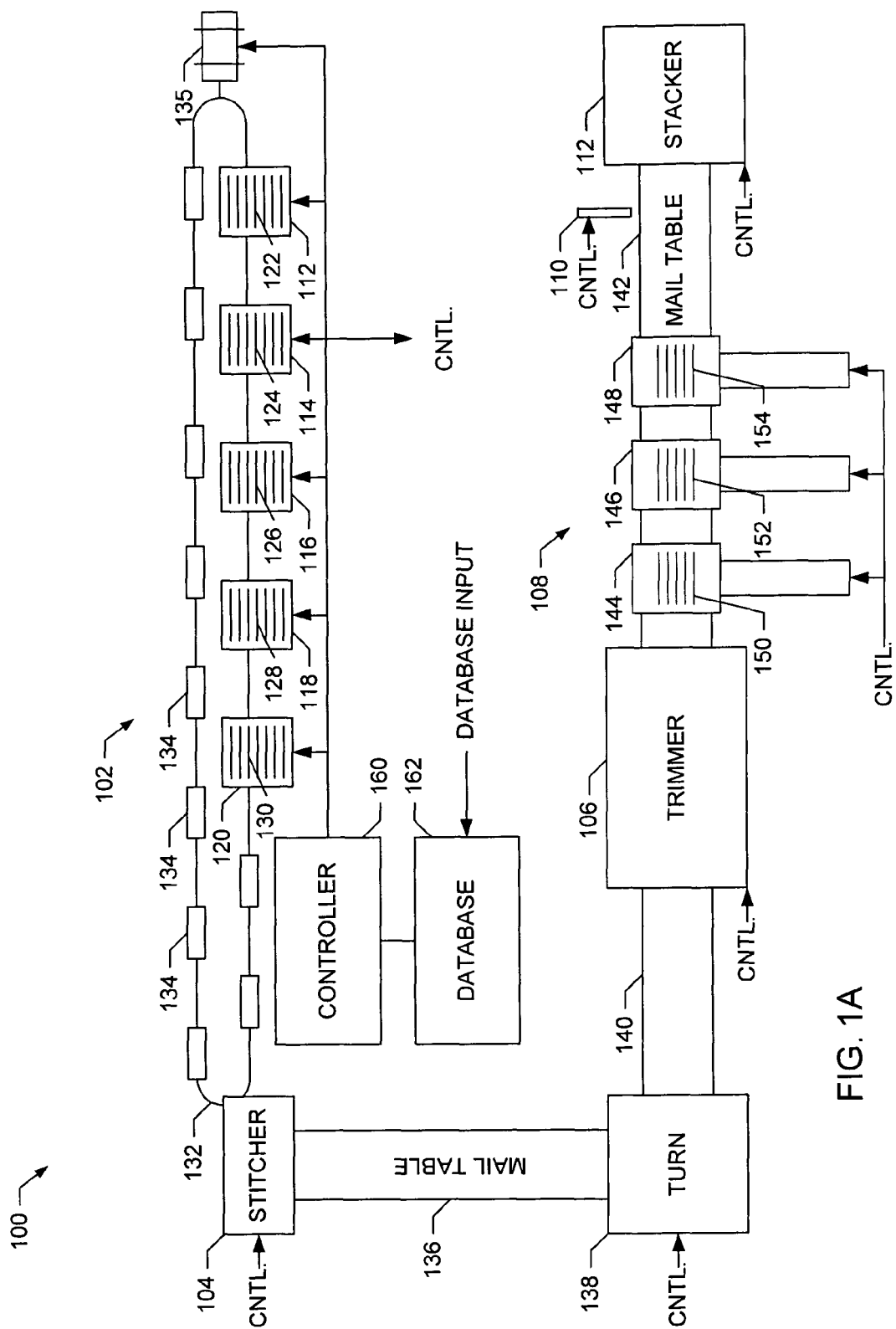
FIG. 1A is a diagram of an example book making system.

Although the following discloses example systems including, among other components, software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the following describes example systems, persons of ordinary skill in the art will readily appreciate that the examples are not the only way to implement such systems.

In general, the example methods and systems described herein may be used to combine mail streams in a binding line. For example, to reduce mailing postage or fees associated with delivering mailings (e.g., books, magazines, catalogs, flyers, and/or any other mailing) the binding line (e.g., an example book making system 100 illustrated in FIG. 1A) may combine each of a plurality of primary books from a first mail stream with secondary books from a second mail stream. In an example implementation, each primary book and secondary book that are combined are addressed to the same recipient. In another example implementation, the primary book is addressed to a first recipient and the secondary book is addressed to a second recipient having a delivery address that is on the same mail delivery route as the delivery address of the first recipient on a mail delivery route. In some cases, the delivery address of the first recipient may be substantially adjacent (e.g., neighboring) the delivery address of the second recipient. Unlike traditional systems that combine mail streams by laying or arranging respective primary and secondary books (i.e., primary and secondary books addressed to the same recipient or to neighboring recipients) in a side-by-side configuration and subsequently stacking the respective primary and secondary books, the example systems and methods described below may be used to increase the throughput and efficiency of a binding line that combines mail streams by feeding secondary books or depositing secondary books onto primary books to form stacks of primary and secondary books as the primary books are advanced on the binding line. Stacking or overlaying secondary books on primary books as the primary books are moved along a binding line reduces the amount of space required for merging mail streams to obtain reduced mailing postage or fees.

In an example implementation, the example methods and systems described herein may also be used to determine when a secondary book is not to be overlaid onto a primary book, thus, requiring a gap or space (i.e., an empty book position or a reserved book position) between two primary books or between two book positions to feed a secondary book between the two book positions. An example criterion used to determine whether a secondary book is to be deposited onto a primary book involves determining whether a last addressee (e.g., a subscriber) on a mail route is a recipient of a secondary book, but not a recipient of a primary book. In this case, instead of depositing a primary book on a book position associated with the last mail route addressee, an empty book position is created at a primary book station (e.g., a gathering section 102 of FIG. 1A) that is subsequently filled with a secondary book at a secondary book feeding station.

In some example implementations that use a secondary book feeder system configured to overlay two or more secondary books onto a primary book, empty book positions may be substantially eliminated by depositing two or more secondary books onto a primary book. For example, if a last addressee on a mail route is a recipient of a secondary book, but not a primary book, a secondary book feeder system may deposit two secondary books onto a primary book as the primary book is moved along the line. In this case, the primary book may be addressed to a first recipient, the first secondary book may be addressed to a second recipient neighboring the first recipient on the mail route, and the second secondary book may be addressed to a third recipient (e.g., the last addressee on the mail route) neighboring the second recipient on the mail route. In this manner, all empty book positions may be substantially eliminated, thus, increasing the throughput of a binding line and sorting line. Although the recipients are described as neighboring recipients, the recipients may not be next door neighbors or be located physically adjacent one another on a mail route. Instead, in some implementations, a secondary book recipient and a primary book recipient may have mailing addresses that are separated by one or more mailing addresses on a mail route not intended to receive either a primary book or a secondary book.

In example implementations that use a secondary book feeder system configured to overlay two or more secondary books onto a primary book, empty book positions may be created if a particular mail route includes relatively more recipients of secondary books than primary books. For example, if a secondary book feeder system is configured to overlay three or less secondary books on a primary book and a mail route includes four consecutive addressees that are recipients of secondary books, but not primary books, then an empty book position may be created adjacent to a primary book on a line. In this case, the secondary book feeder system may deposit three secondary books on the primary book that are addressed to the first three recipients of the secondary books and subsequently deposit the fourth secondary book intended for the fourth recipient of the secondary book onto the empty book position.

As described in greater detail below, an example binding line forms a plurality of primary books using, for example, a saddle stitch binding method. For each book position in the binding line, a controller determines whether a primary book is associated with a secondary book (e.g., determines if a primary book and a secondary book are addressed to the same recipient or to recipients listed consecutively on a mail route or a mail list). If two consecutive primary books are associated with respective secondary books, the controller causes the binding line to gather or create the primary books on two book positions adjacent to one another without an interposing empty book position between the primary books. In this manner, a secondary book feeder can subsequently feed or deposit respective secondary books onto the primary books as the primary books are moved along the line. However, if the controller determines that a particular book position is associated with a secondary book, but not a primary book (e.g., a last addressee on a mail route is a recipient of the secondary book, but not the primary book), then the controller causes the binding line to create a gap or an empty book position reserved for a secondary book or the controller causes the binding line not to create an empty book position and instead causes a secondary book feeder system to deposit (e.g., overlay) two secondary books onto a primary book.

Now turning to FIG. 1A, an example book making system 100 generally includes a gathering section 102 that feeds gathered signatures to a stitcher 104, which stitches the gathered signatures into primary books. From the stitcher 104, the primary books are routed to a trimmer 106 that trims the edges of the signatures that form the primary books. Collectively, the gathering section 102, the stitcher 104 and the trimmer 106 are used to form a primary book source.

After trimming, the primary books pass a secondary book feeder system 108 (i.e., a secondary book source) where secondary books are selectively commingled with the primary books. The secondary books handled by the secondary book feeder system 108 are, in the example of FIG. 1A, preprinted and bound books that may be perfect bound, saddle stitched or bound in any other desirable way. The secondary books are provided to the secondary book feeder system 108 via pallet or conveyor line.

After the books from the primary and secondary sources are commingled at the secondary book feeder system 108, the books are personalized or addressed by a printer 110 and passed to a stacker 112. The stacker 112 bundles the primary and secondary books to obtain postal service discounts based on bundled mailings that are destined to the same general geographic location (e.g., associated with the same postal code). Additionally, books from the secondary source can be commingled with pre-addressed messaging already applied to the secondary books in a separate operation.

In particular, the gathering section 102 includes a number of pockets 112-120 above which a number of signatures 122-130 are disposed. Although only five example pockets are designated in FIG. 1A, the gathering section 102 may include any number of pockets, such as, for example, 18 pockets. A saddle chain 132 having a number of saddles, three of which are shown in FIG. 1A at reference numeral 134, disposed thereon passes under the pockets 112-120. Collectively, the saddle chain 132 and the saddles 134 may be referred to as a line. Each of the saddles 134 is associated with a particular book position such that a first saddle 134 comprises a first book position, a second saddle 134 comprises a second book position, etc. Generally, in operation, each of the pockets 112-120 opens its respective signature (e.g., signatures 122-130) and deposits the same on a saddle 134 of the saddle chain 132. A motor 135 or other drive mechanism is provided to advance the saddle chain 132. As the saddles 134 advance under the pockets 112-120, the signatures 122-130 are gathered into books. For example, the first signature 122 forms the middle two sheets of, for example, a magazine. The second signature 124 forms the second sheets from the middle, and so on until the last signature 130 is placed onto a saddle 134 as the front and rear cover of the magazine. Although in the illustrated example the gathering section 102 is implemented using a saddle stitch binding, in other example implementations, the gathering section 102 may be implemented using a square-back binding line, a perfect-bound binding line, a patent-bound binding line, or any other type of binding line.

While the foregoing generally describes the operation of the gathering section 102, as described below, the gathering section 102 is controlled to form a primary book on one of the saddles 134 that is associated with a book position intended to receive a primary book and a secondary book. In this manner, the secondary book feeder system 108 can subsequently deposit a secondary book onto the primary book as the primary book is moved through the example book making system 100. Additionally, in some example implementations, for each one of the saddles 134 associated with a last addressee on a mail route that is a recipient of a secondary book, but not a primary book, the gathering section 102 is controlled to selectively leave that saddle 134 free from signatures to create a gap or an empty book position in the line of gathered primary books. The gap in the line of gathered books is perpetuated throughout the entire system until the gap reaches the secondary book feeder system 108, which inserts a completed secondary book into the gap in the line. Alternatively, in other example implementations in which a secondary book feeder system is configured to deposit two or more secondary books onto a primary book, the gathering section 102 may be controlled to leave substantially no empty book positions in the line and the secondary book feeder system is instructed to deposit two or more secondary books onto a primary book when, for example, one or more last addressee(s) on mail routes are recipients of secondary books, but not primary books.

The gathered books are passed from the gathering section 102 to the stitcher 104 where, for example, the spines of the books are stapled. The output of the stitcher 104 passes to a first mail table 136. The mail table 136 is segmented, for example, in 15 inch increments and the primary books output from the stitcher 104 are filled into the segments of the mail table. If no book (e.g., an empty book position) is provided to the stitcher 104 by the gathering section 102, the mail table 136 is advanced nonetheless, thereby leaving a gap or an empty book position in the line for a secondary book to be inserted at a later point in the system 100.

The mail table 136 feeds a turn 138 that joins the mail table 136 and a conveyor 140 at approximately a right angle. As noted previously, in some example implementations, the mail table 136 may include a gap for at least one of the secondary books 150-154 to be later deposited if, for example, a last addressee on a mail route is a recipient of a secondary book, but not a primary book. The spacing is maintained by the turn 138, and, accordingly, the conveyor 140 is advanced whether or not the turn 138 passes a book to the conveyor 140.

The conveyor 140 feeds the trimmer 106, which, as described above, trims the edges of the books provided thereto. In example implementations in which empty book positions are created on the on the conveyor 140 for secondary books, the trimmer 106 will not always receive a book for trimming. Accordingly, the trimmer 106 may not always need to actuate. The output of the trimmer 106 which, in some cases, is a trimmed book and in other cases may be nothing (e.g., an empty book position), is passed to a second mail table 142.

The secondary book feeder system 108 includes a number of secondary feeders, three of which are shown at reference numbers 144-148 and contain secondary books 150-154, respectively. The secondary books 150-154 may be the same or different from one another. As described in further detail below, when a primary book or an empty book position on the mail table 142 associated with a secondary book is disposed under one of the secondary feeders 144-148, the secondary feeder over the primary book or the book position is selectively actuated to deposit a secondary book onto the primary book or the empty book position on the mail table 142. In some example implementations in which the secondary book feeder system 108 is configured to deposit two or more secondary books onto a book position (e.g., onto a primary book), the secondary feeder 144 may deposit a first secondary book on a primary book and the secondary feeder 146 may deposit a second secondary book on the primary book as the primary book is moved along the second mail table 142.

After the secondary books are deposited, the mail table 142 passes the primary and secondary books by the printer 110 that may address or otherwise customize or personalize any or all of the books (either primary or secondary) on the mail table 142. The books are then provided to the stacker 112, and the stacker 112 bundles the books to receive available mailing discounts.

In practice the foregoing-described gathering section 102, stitcher 104, trimmer 106 and stacker 112 may be implemented using a system available from Müller Martini, Ltd., under the model name of Tempo. However, as will be readily appreciated by those having ordinary skill in the art, gathering, stitching, trimming and stacking systems are commercially available from other sources, such as, for example, Heidelberg and McCain. Additionally, the secondary feeders 144-148 may be implemented using feeders commercially available from Buhrs® or Streamfeeder, LLC. In an example implementation, the secondary feeders 144-148 are implemented using the Buhrs® 4000 system from Buhrs®. In another example implementation, the secondary feeders 144-148 may be implemented using Streamfeeder® model XL 1200 from Streamfeeder, LLC.

While the foregoing has addressed the components of the system 100 germane to paper, signature and book handling and has generally outlined the operation of the system, the following is pertinent to control aspects of the system 100. In particular, the system 100 includes a controller 160 having an associated database 162. In the example of FIG. 1A, the controller 160 may be implemented using a Maverick controller model Video Jet VIP 9500 binding line control system. In the alternative, the controller 160 could be any processing unit, such as a microprocessor, a microcontroller, a programmable logic controller (PLC) or any other suitable logic device. Also, the controller 160 and/or the database 162 may be implemented using a processor system such as, for example, an example processor system 900 of FIG. 9. The controller 160 may include a memory into which machine executable instructions implementing one or more control routines (e.g., control routines based on flow diagrams of FIGS. 2-7) may be stored. The controller 160 is interfaced to, and controls the pockets 112-120, the motor 135, the stitcher 104, the turn 138, the trimmer 106, the secondary feeders 144-148, the printer 110 and the stacker 112.

The database 162, which may be implemented as any suitable machine-readable media, stores name and address information for addressees or recipients. To determine whether a particular addressee is to receive a primary book and/or a secondary book, the database may also include information indicating whether a particular addressee is a recipient of the primary book and/or the secondary book. In an alternative implementation, the controller 160 may determine whether an addressee is a recipient of a primary book and/or a secondary book by comparing name and address information associated with the primary and secondary books to find matches. The information in the database 162 dictates how the controller 160 will control the various components of the system 100.

FIG. 1B is a diagram of a portion of the example book making system 100 (FIG. 1A) depicting example commingled primary and secondary books. Specifically, FIG. 1B illustrates a plurality of primary books 156 on the second mail table 142 without any empty book positions between the primary books 156. FIG. 1B also illustrates a plurality of secondary books 150-154 deposited by the secondary feeders 144-148 onto the primary books 156. As shown, an example book position 158a is associated with one of the primary books 156, but none of the secondary books 150-154. In this case, when the primary book 156 is moved along the mail table 142, none of the secondary feeders 144-148 are actuated to deposit any of the secondary books onto the primary book 156. Another example book position 158*b* is associated with one of the primary books 156 and two of the secondary books 152 and 154. In this case, when the primary book 156 is moved along the mail table 142, the secondary feeders 146 and 148 are actuated to deposit secondary books 152 and 154, respectively, onto the primary book 156. The primary book 156 and the secondary books 152 and 154 may be addressed to the same recipient, or each of the books 152, 154, and 156 may be addressed to different recipients that appear consecutively on a mail listing for a particular mail route.

As shown in FIG. 1C, in some example implementations in which the secondary book feeder system 108 is configured to deposit only one secondary book onto a primary book, an empty book position 160 may be created when a last addressee on a mail route is a recipient of the secondary book, but not the primary book. An example book position 162*a* may include one of the primary books 156, while an example book position 162*b* that previously included a space, gap, or otherwise an empty book position (e.g., the empty book position 160) may include one of the secondary books 150 (or one of the other secondary books 152 or 154).

Figure 2:
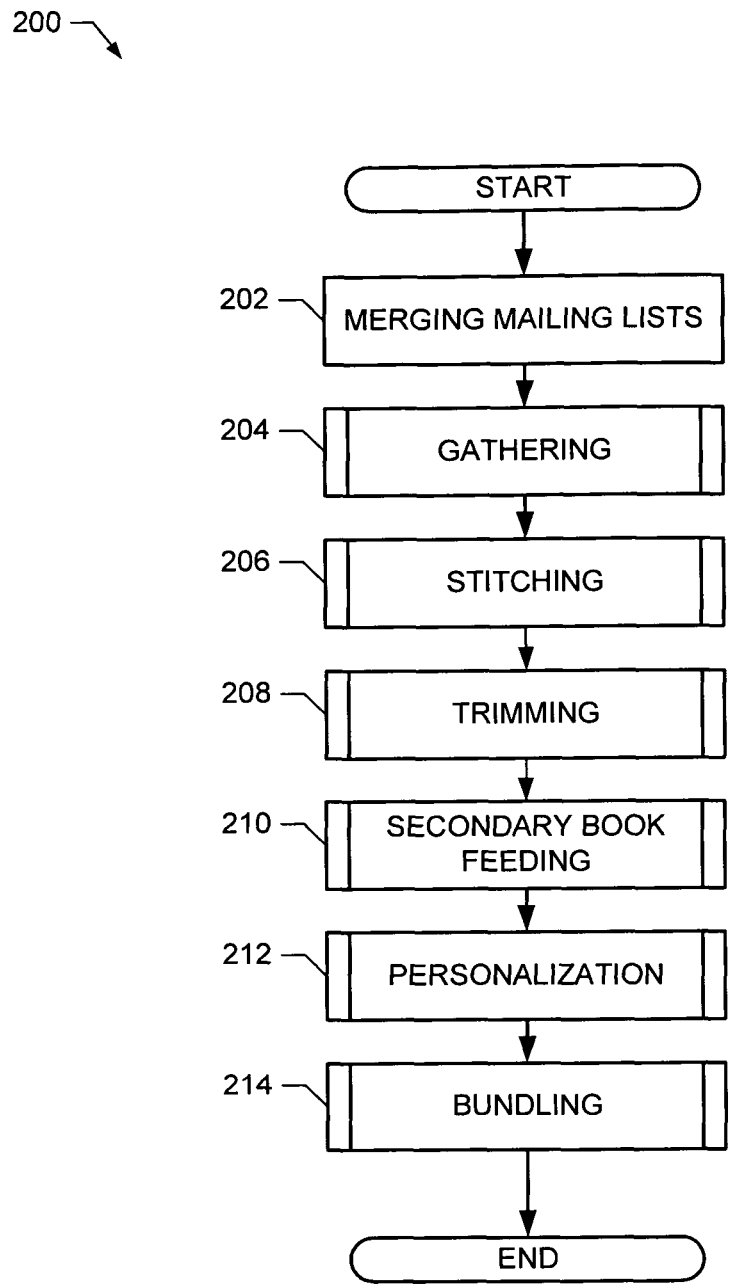
FIG. 2 is a flow diagram of an example book making process that may be carried out by the controller of FIG. 1A.

Turning to FIG. 2, an example book making process 200 carried out by the controller 160 is shown as including a merging mail list process (block 202), a gathering process (block 204), a stitching process (block 206), a trimming process (block 208), a secondary book feeding process (block 210), a personalization process (block 212) and a bundling process (block 214). When the system 100 is operating, each of the processes (blocks 202-214) may be performed in parallel. However, for ease of understanding, the following description refers to the processes (blocks 202-214) as being sequential.

Initially, the controller 160 (FIG. 1A) performs the merging mail list process (block 202). During the merging mail list process at block 202, the controller 160 obtains two or more mail lists including names and addresses of recipients and merges the two or more mail lists to generate a master mail list. The controller 160 may obtain the two or more mail lists from the database 162 (FIG. 1A) or from any other data source and store the master mail list in the database 162. The controller 160 can sort the names and addresses in the master mail list based on zip code, street address, recipient name, etc., to enable forming geographically organized mail bundles eligible for reduced postage rates. The controller 160 also sorts the names and addresses to identify whether addressees are recipients of primary books and/or secondary books and/or whether a recipient of primary book is listed adjacent a recipient of a secondary book on a particular mail route.

Figure 3:
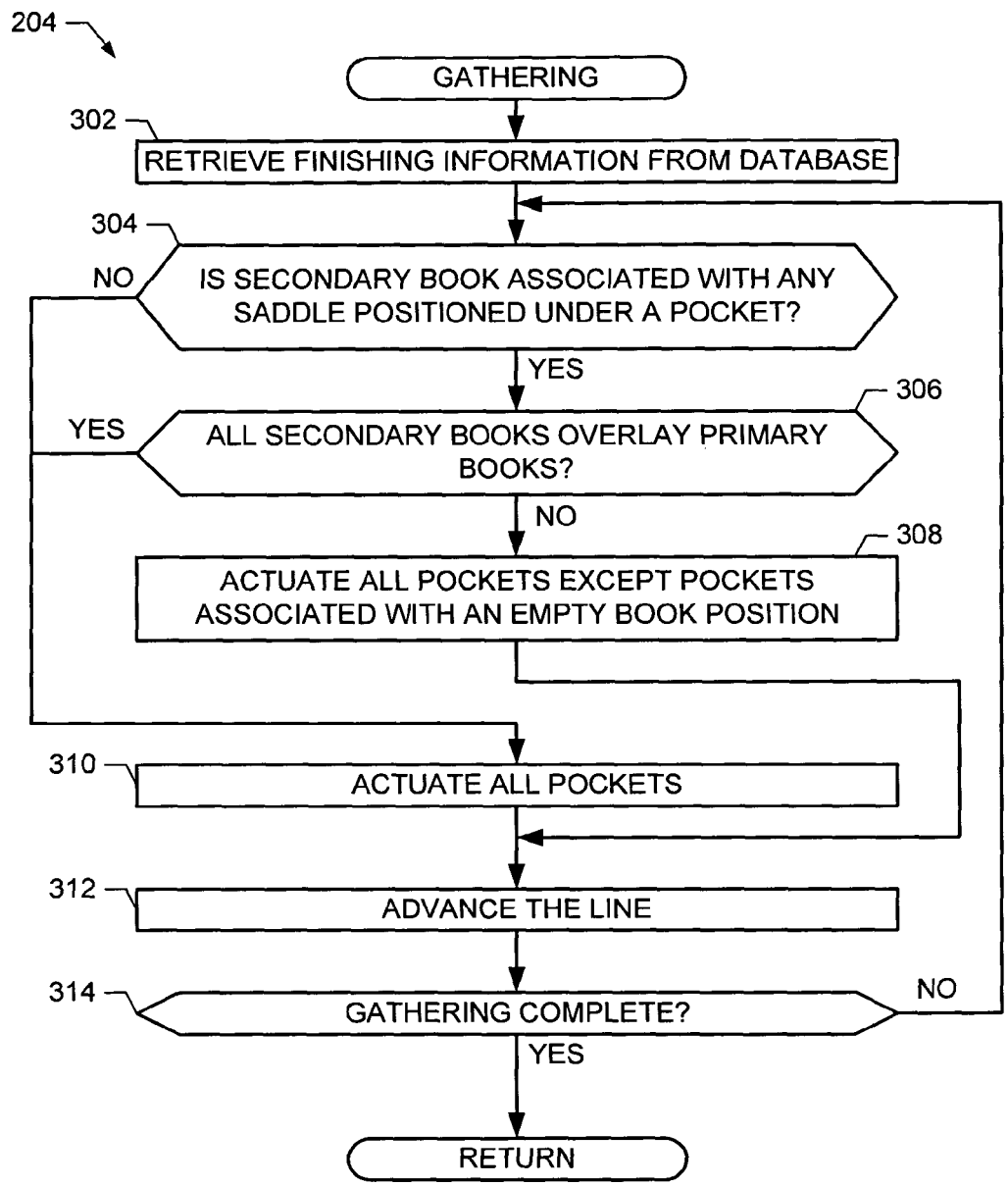
FIG. 3 is a flow diagram depicting an example method that may be used to implement an example gathering process of FIG. 2.

A flow diagram illustrated in FIG. 3 depicts an example method that may be used to implement the gathering process of block 204 (FIG. 2) (i.e., the gathering process 204). As shown in FIG. 3, the controller 160 (FIG. 1A) retrieves finishing information (e.g., the master mailing list) from the database 162 (FIG. 1A) (block 302). The finishing information may include a series of addressees to receive books, their mailing addresses and an indication of whether a particular addressee is to receive a primary book and/or a secondary book.

After saddles (e.g., the saddles 134 of FIG. 1A) are positioned under the pockets 112-120 (FIG. 1A), the controller 160 determines if a secondary book is associated with any saddle 134 under one of the pockets 112-120 (block 304). For example, the controller 160 may determine based on the finishing information obtained at block 302 if any addressees associated with book positions of the saddles 134 under the pockets 112-120 are recipients of a secondary book. Additionally or alternatively, the controller 160 may determine if for the saddles 134, the finishing information includes a recipient of a primary book listed adjacent a recipient of a secondary book for a particular mail route.

If the controller 160 determines at block 304 that any one or more of the book positions of the saddles 134 is to receive a secondary book, then the controller 160 determines if all of the secondary books are to overlay a primary book (block 306). For example, in an example implementation in which the secondary book feeder system 108 is configured to deposit two or more secondary books onto a primary book, then the controller 160 determines that all of the secondary books identified at block 304 are to overlay primary books. However, the controller 160 may determine that not all secondary books identified at block 304 are to overlay primary books if a secondary book feeder system is configured to overlay less secondary books on a primary book (or a book position) than a number of consecutive addressees on a mail route that are recipients of secondary books, but not primary books. In this case, not all of the secondary books identified at block 304 are to overlay primary books and one or more empty book positions may be created to accommodate some of the secondary books at the secondary book feeder system 108.

In example implementations in which the secondary book feeder system 108 is configured to deposit only one secondary book on a primary book, then the controller 160 may determine based on the finishing information obtained at block 302 if any of the saddles 134 is associated with a last addressee on a mail route that is a recipient of a secondary book, but not a primary book. In this case, if one of the saddles 134 is associated with a last addressee on a mail route that is a recipient of a secondary book, but not a primary book, then the controller 160 determines at block 306 that not all of the secondary books identified at block 304 are to overlay primary books.

If the controller 160 determines at block 306 that not all of the secondary books identified at block 304 are to overlay primary books, then the controller 160 causes all of the pockets 112-120 to actuate except those pockets associated with an empty book position (e.g., a book position associated with a last addressee on a mail route that is intended to receive a secondary book, but not a primary book) (block 308). In this manner, each of the empty book positions can be subsequently filled as described below in connection with FIG. 6 by the secondary book feeder system 108.

If the controller 160 determines at block 304 that none of the saddles under one of the pockets 112-120 is associated with a secondary book, or if the controller 160 determines at block 306 that each of the secondary books identified at block 304 is to overlay a primary book, then the controller actuates all of the pockets 112-120 (block 310). In this manner, as described below in connection with FIG. 6, the secondary book feeder system 108 can feed none, one or more secondary books onto any primary book based on the finishing information obtained at block 302.

After the controller 160 causes all of the pockets 112-120 to actuate at block 310, or after the controller 160 causes some of the pockets 112-120 to actuate at block 308, the line (e.g., the saddle chain 132 of FIG. 1A) is advanced (block 312). Advancing the line 132 after actuating all of the pockets 112-120 at block 310 results in filling each of the saddles 134 under the pockets 112-120 regardless of whether an addressee is a recipient of only a primary book, only a secondary book or a recipient of both primary and secondary books. Thus, in example implementations in which the secondary book feeder system 108 is configured to deposit two or more secondary books onto a primary book, even if a last addressee on a mail route is a recipient of a secondary book, but not a primary book, no empty book positions are created in the line 132, thus increasing the throughput of the example book making system 100 when merging mailing streams. Advancing the line 132 without actuating one or more of the pockets 112-120 at block 304 results in creating an empty book position in any of the saddles 134.

The controller 160 then determines if the gathering process 202 is complete (block 314). If the gathering process 202 is not complete, control is passed back to the operation of block 304. Otherwise, if the controller 160 determines at block 314 that the gathering process 202 is complete, control is returned to a calling function or process such as, for example, the example book making process 200 depicted in the flow diagram of FIG. 2.

As described above, the controller 160 determines if a primary book should be gathered in the gathering section 102 based on the master mailing list stored in the database 162 and causes the gathering section 102 to gather signatures to create primary books on an as-needed basis. In other words the controller 160 implements a demand-driven production of the primary books based on the master mailing list to reduce or substantially eliminate a surplus of primary books on the line. In this manner, in example implementations in which the secondary book feeder system 108 deposits secondary books onto empty book positions, the example book making system 100 may be configured to operate without using any buffer areas or book storage areas in which to store a surplus of primary books when relatively more addressees in the mailing list are recipients of secondary books than primary books. Eliminating the need for any buffer areas reduces the floor space and the cost associated with implementing the example book making system 100.

Figure 4:
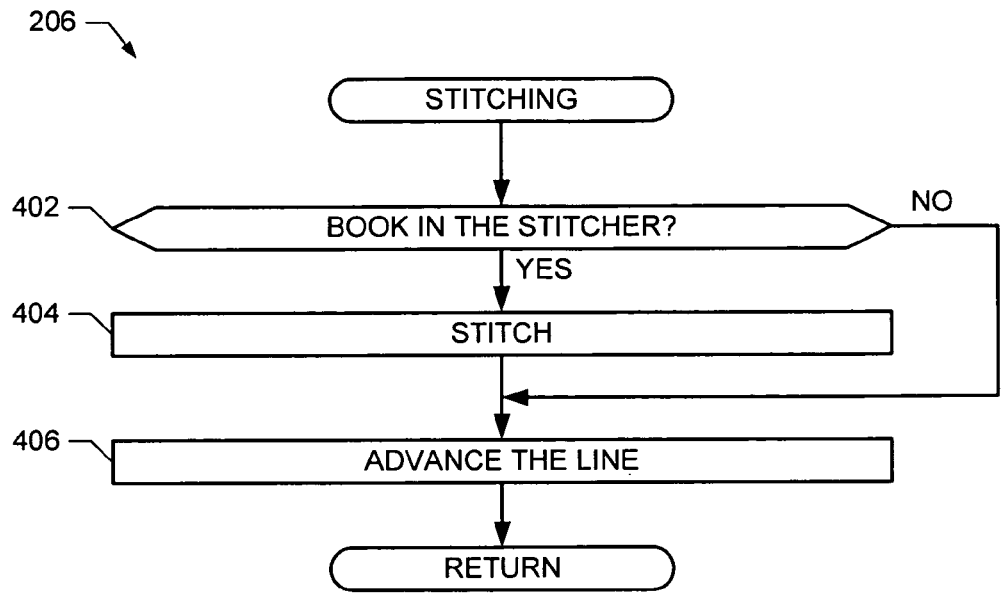
FIG. 4 is a flow diagram depicting an example method that may be used to implement an example stitching process of FIG. 2.

FIG. 4 illustrates a flow diagram that depicts an example method that may be used to implement the stitching process of block 206 (FIG. 2) (i.e., the example stitching process 206). As shown in FIG. 4, the controller 160 (FIG. 1A) begins by determining if there is a book in the stitcher 104 (block 402). If there is a book in the stitcher 104, the book is stitched (block 404) and the line is advanced (block 406). Alternatively, if there is no book in the stitcher 104 (i.e., an empty book position on the line intended for a secondary book has reached the stitcher 104), the line is advanced (block 406). After the line is advanced (block 406), control is returned to the book making process 200 (FIG. 2), which continues operation at the trimming process (block 208) (FIG. 2).

Figure 5:
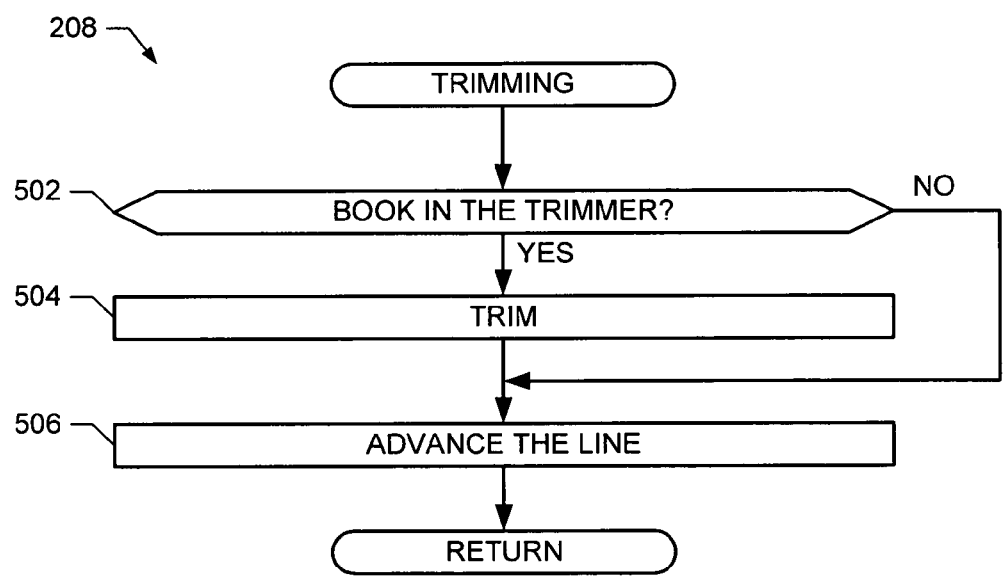
FIG. 5 is a flow diagram depicting an example method that may be used to implement an example trimming process of FIG. 2.

FIG. 5 illustrates a flow diagram depicting an example method that may be used to implement the trimming process of block 208 (FIG. 2) (i.e., the trimming process 208). As shown in FIG. 5, the controller 160 (FIG. 1A) determines if a book is in the trimmer 106 (block 502). If there is a book in the trimmer 106 (block 502), the book is trimmed (block 504) and the line is advanced (block 506). Alternatively, if an empty book position in the line has reached the trimmer 106 and the trimmer 106 is empty (block 502), the line is advanced (block 506), without the actuation of the trimmer 106. After the line is advanced (block 506), control is returned to the book making process 200 (FIG. 2), which continues operation at the secondary book feeding process (block 210) (FIG. 2).

Figure 6:
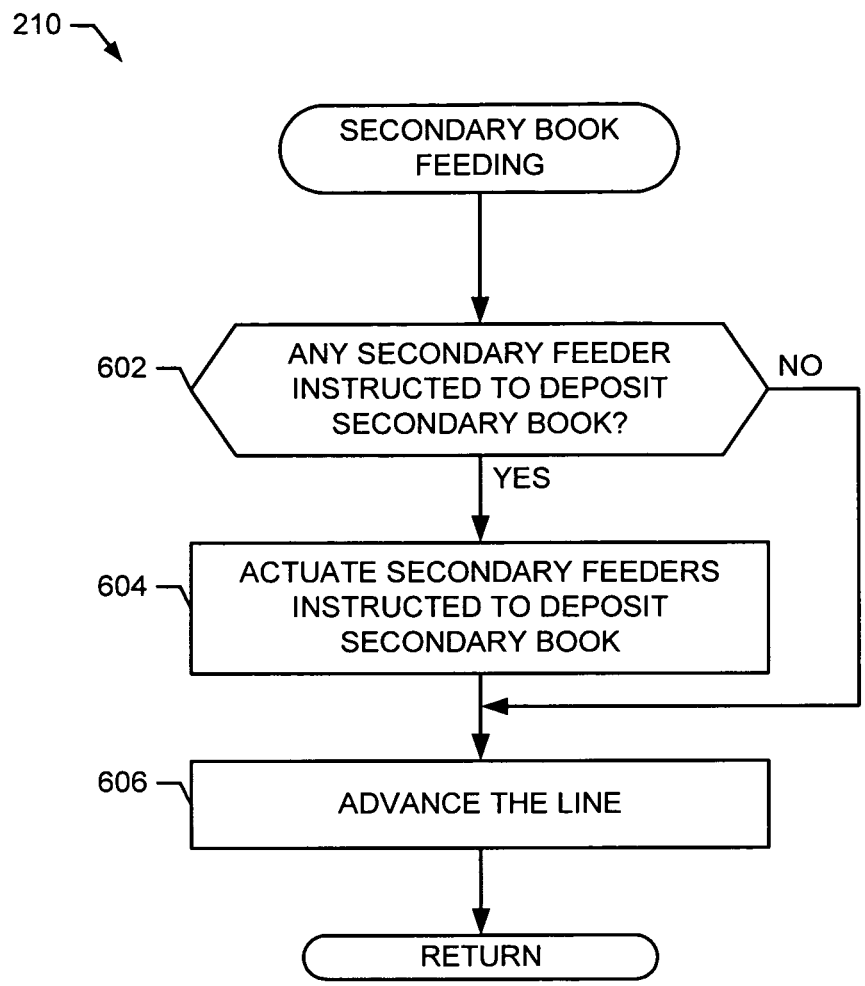
FIG. 6 is a flow diagram depicting an example method that may be used to implement an example secondary book feeding process of FIG. 2.

FIG. 6 illustrates a flow diagram depicting an example method that may be used to implement the secondary book feeding process of block 210 (FIG. 2) (i.e., the secondary book feeding process 210). As shown in FIG. 6, the controller 160 determines if any of the secondary feeders 144-148 has been instructed to deposit or feed a secondary book (block 602). For example, in an example implementation in which the secondary book feeder system 108 is configured to deposit only one secondary book onto a primary book, any of the secondary feeders 144-148 may be instructed to feed a secondary book onto an empty book position associated with a last addressee on a mail route that is a recipient of a secondary book, but not a primary book. Also, any of the secondary feeders 144-148 may be instructed to feed a secondary book onto a book position having a primary book for an addressee that is a recipient of both primary and secondary books. Of course, any of the secondary feeders 144-148 may be instructed to deposit or feed a secondary book in any case in which book positions under the secondary feeders 144-148 are intended to receive a secondary book.

In an example implementation in which each of the secondary feeders 144-148 feeds a different book title (e.g., the secondary feeder 144 feeds a first magazine title, the secondary feeder 146 feeds a second magazine title, and the secondary feeder 148 feeds a catalog), two or more of the secondary feeders 144-148 may be instructed to deposit a respective book onto a particular book position as the book position traverses the secondary book feeder system 108. Thus, in some example implementations, the secondary book feeder system 108 may be used to create and output to the mail table 142 stacks of three or more books including a primary book and two or more different secondary books (e.g., a stack including a first book title, a second book title, a third book title, etc.).

If the controller 160 determines at block 602 that any of the secondary feeders 144-148 has been instructed to feed a secondary book, then the ones of the secondary feeders 144-148 instructed to deposit a secondary book are actuated (block 604). After some or all of the secondary feeders 144-148 are actuated at block 604, or if the controller 160 determines at block 602 that none of the secondary feeders 144-146 was instructed to deposit a secondary book, the line is advanced (block 606). Control is then returned to the book making process 200 (FIG. 2), which continues operation at the personalization process (block 212) (FIG. 2).

Figure 7:
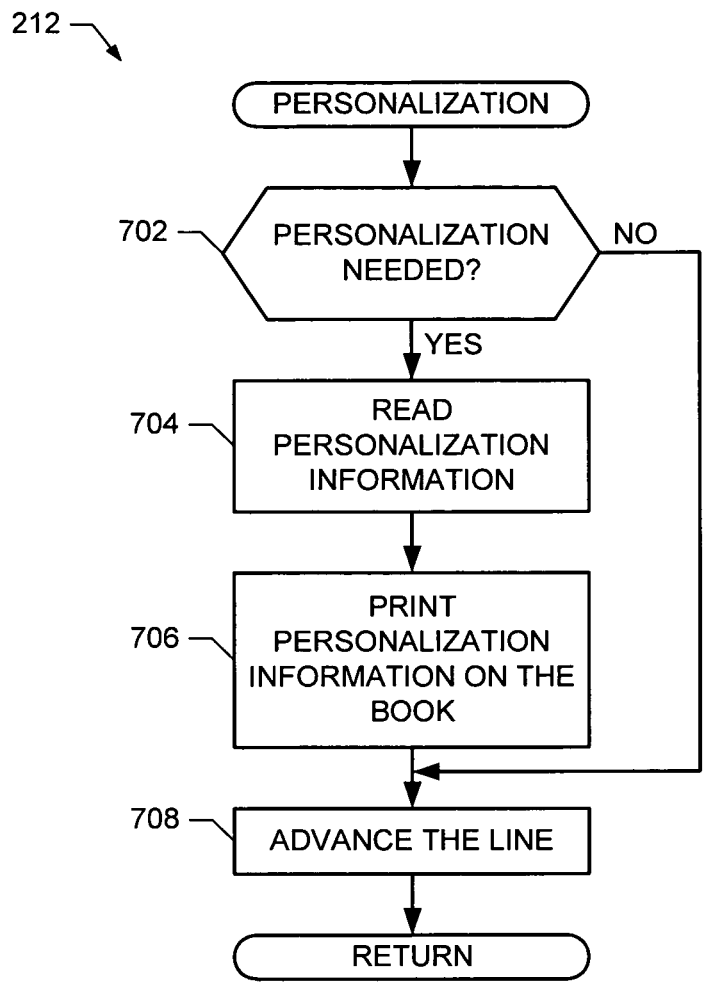
FIG. 7 is a flow diagram depicting an example method that may be used to implement an example personalization process of FIG. 2.

FIG. 7 illustrates a flow diagram depicting an example method that may be used to implement the personalization process of block 212 (FIG. 2) (i.e., the personalization process 212). In the illustrated example, the personalization process 212 is implemented using the printer 110 to print custom information onto the books on the mail table 142. As shown in FIG. 7, the controller 160 determines if a book below the printer 110 (either a primary book or a secondary book) requires personalization (block 702). Whether personalization is needed is determined by information in the database 162, as well as the book (or absence of a book) below the printer 110. For example, the database 162 may not specify any personalization information for a particular book, in which case nothing will be printed on the book below the printer 110.

If personalization is needed (block 702), the personalization information (e.g., the information to be printed on a book below the printer 110) is read from the database 162 (block 704) and is printed onto the book (block 706). Personalization information may include names, addresses, textual messages, graphics or any other textual or graphical information that may be printed onto a book by the printer 110.

After the personalization information is read and printed onto the book (blocks 704 and 706), or if the controller 160 determines at block 702 that a book under the printer 110 does not require personalization, the line is advanced (block 708). Advancing the line places a next book position below the printer 110 that may include one or more books (e.g., a primary book and/or a secondary book). Control is then returned to the book making process 200 (FIG. 2), which continues operation at the bundling process (block 214) (FIG. 2).

Figure 8:
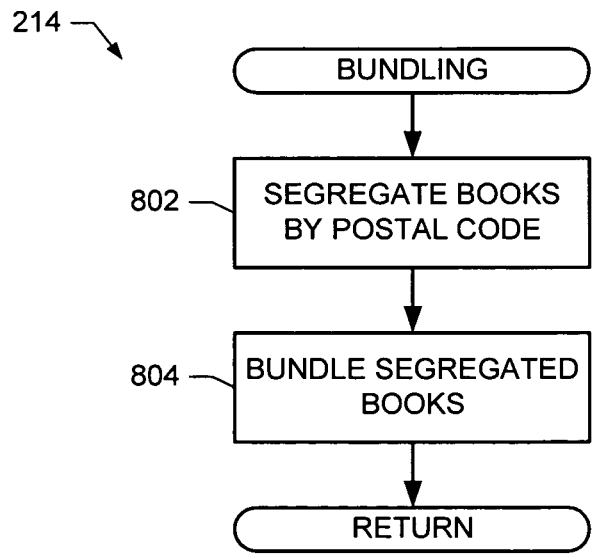
FIG. 8 is a flow diagram depicting an example method that may be used to implement an example bundling process of FIG. 2.

FIG. 8 illustrates a flow diagram depicting an example method that may be used to implement the bundling process of block 214 (FIG. 2) (i.e., the bundling process 214). As shown in FIG. 8, the stacker 112 segregates books by postal code (block 802) and bundles the segregated books (block 804). Because the secondary books and primary books are fed or deposited onto the line according to a master mailing list that has been sorted according to postal zip codes and addresses, the primary and secondary books output from the mail table 142 to the stacker 112 are, by definition, sorted. For example, if Jane Smith residing at 102 Someway Ave. is designated in the database 162 as intended to receive a secondary book and a primary book, and if Jane's next-door neighbor John Smith residing at 104 Someway Ave. is designated in the database 162 as intended to receive a primary book, but not a secondary book, the secondary and primary books addressed to Jane Smith may be stacked on the line in a first book position immediately adjacent to a second book position having the primary book addressed to John Smith.

Although for some example implementations the foregoing describes the gathering section 102 as creating gaps or empty book positions in the line that are perpetuated by components of the system to create gaps in the line at the mail table 142, the gaps for secondary books could be created any number of other ways. For example, any of the system 100 components could be used to advance the line without providing a primary book component thereto. In particular, the trimmer 106 could be controlled to advance the line to make room in the line for one or more secondary books.

Figure 9:
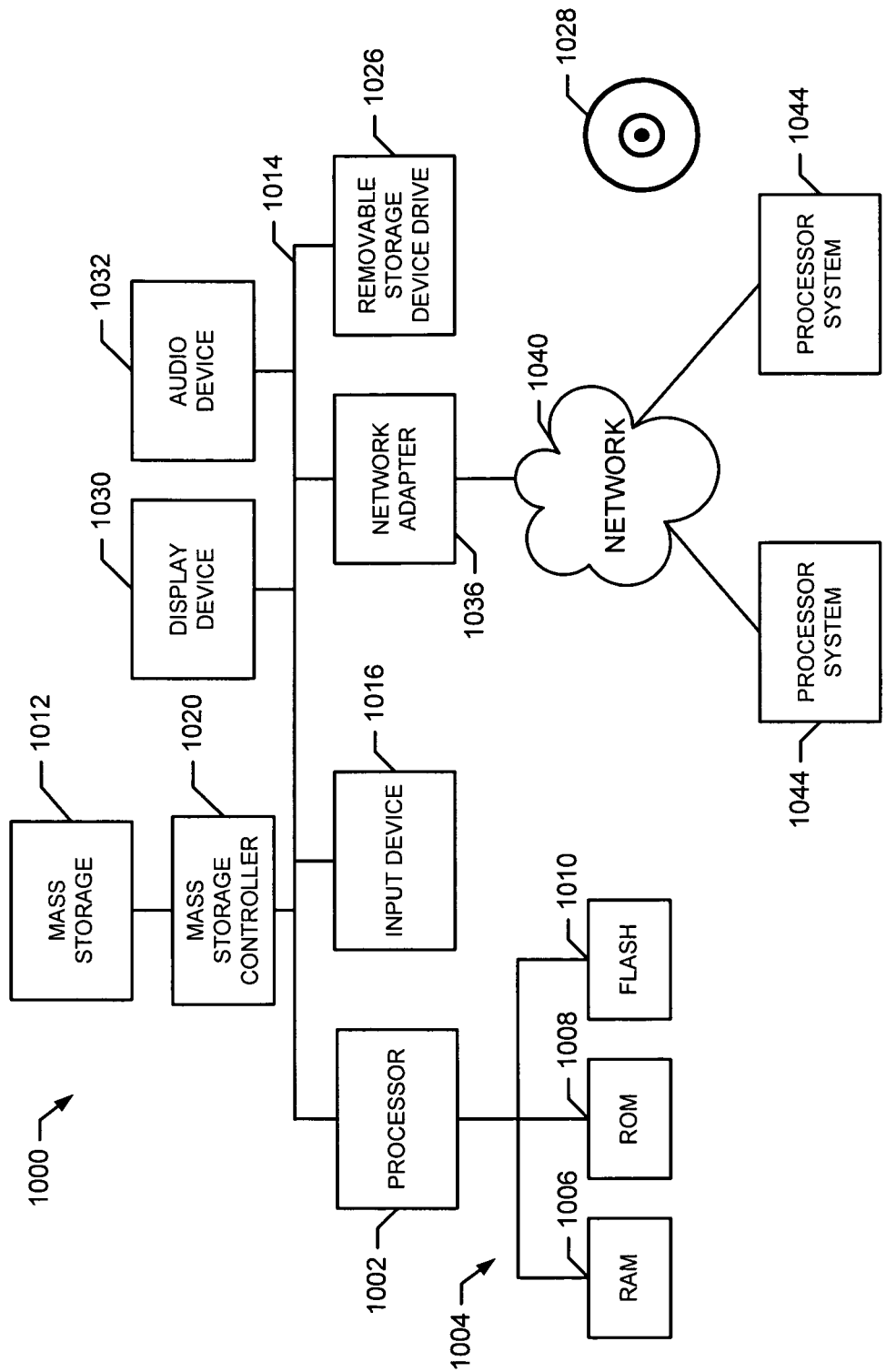
FIG. 9 depicts an example processor system that, in general, may be used to implement the example methods and systems described herein.

FIG. 9 depicts an example processor system 900 that, in general, may be used to implement the example methods and systems described herein. The example processor system 900 includes a processor 902 having associated system memory 904. The system memory 904 may include one or more of a random access memory (RAM) 906, a read only memory (ROM) 908, and a flash memory 910, or any other type of memory device.

The processor 902, in the example of FIG. 9, is coupled to an interface, such as a bus 914 to which other peripherals or devices are interfaced/coupled. In the illustrated example, the peripherals interfaced to the bus 914 include an input device 916, a mass storage controller 920 communicatively coupled to a mass storage memory 912 (e.g., a hard disk drive), and a removable storage device drive 926. The removable storage device drive 926 may include associated removable storage media 928, such as magnetic or optical media. The example processor system 900 of FIG. 9 also includes a display device 930 and an audio device 932, both of which are peripherals coupled to the bus 914.

The example processor system 900 may be, for example, a conventional desktop personal computer, a notebook computer, a workstation or any other computing device. The processor 902 may be any type of processing unit, such as a microprocessor from Intel or any other processor manufacturer.

The memories 906, 908, and 910, which form some or all of the system memory 904, may be any suitable memory devices and may be sized to fit the storage demands of the system 900. The ROM 908, the flash memory 910, and the mass storage memory 912 are non-volatile memories. Additionally, the mass storage memory 912 may be, for example, any magnetic or optical media that is readable by the processor 902.

The input device 916 may be implemented using a keyboard, a mouse, a touch screen, a track pad, microphone, or any other device that enables a user to provide information to the processor 902. Further examples may include a cell phone, a personal digital assistant (PDA), a remote control, etc.

The removable storage device drive 926 may be, for example, an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 928 is complimentary to the removable storage device drive 926, inasmuch as the media 928 is selected to operate with the drive 926. For example, if the removable storage device drive 926 is an optical drive, the removable storage media 928 may be a CD-R disk, a CD-RW disk, a DVD disk, or any other suitable optical disk. On the other hand, if the removable storage device drive 926 is a magnetic media device, the removable storage media 928 may be, for example, a diskette, or any other suitable magnetic storage media.

The display device 930 may be, for example, a liquid crystal display (LCD) monitor, a cathode ray tube (CRT) monitor, or any other suitable device that acts as an interface between the processor 902 and a user's or observer's visual sense. Furthermore, the display device 930 may be part of a conventional television.

The example processor system 900 also includes a network adapter 936 that provides network connectivity between the processor 902 and a network 940. As shown in FIG. 9, further processor systems 944 may be coupled to the network 940, thereby providing for information exchange between the processor 902 and the processors of the processor systems 944.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of combining mail streams, comprising:
    creating a first book on a production line, wherein the first book is associated with a first recipient address; and
    depositing a second book via a book feeder on the first book as the first book moves along the production line, wherein the second book is associated with a second recipient address.

2. A method as defined in claim 1, wherein the first and second recipient addresses are obtained from a mailing list stored in a database.

3. A method as defined in claim 1, wherein the first book is associated with a first book title, and wherein the second book is associated with a second book title.

4. A method as defined in claim 1, wherein the size of the first book is different from the size of the second book.

5. A method as defined in claim 1, wherein creating the first book comprises creating the first book using a saddle stitch binding process.

6. A method as defined in claim 1, further comprising printing personalized information on at least one of the first and second books.

7. A method as defined in claim 1, further comprising forming a bundle of books including the first and second books, wherein the recipient address of each book in the bundle of books is associated with the same postal code.

8. An apparatus to combine mail streams, comprising:
    a controller;

a memory coupled to the controller and having a plurality of instructions stored thereon that enable the controller to:

determine that a first primary book is associated with a first recipient address and a first secondary book is associated with a second recipient address; and deposit the first secondary book via a book feeder on the first primary book at a first book position on a production line.

9. An apparatus as defined in claim 8, wherein the instructions stored in the memory enable the controller to create an empty book position if a second book position is associated with a second secondary book.

10. An apparatus as defined in claim 8, wherein the first primary book is associated with a first book title, and wherein the first secondary book is associated with a second book title.

11. An apparatus as defined in claim 8, wherein the size of the first primary book is different from the size of the first secondary book.

12. An apparatus as defined in claim 8, wherein the instructions stored in the memory enable the controller to create the first primary book via a saddle stitch binding process.

13. An apparatus as defined in claim 8, wherein the instructions stored in the memory enable the controller to print personalized information on at least one of the first primary book or the first secondary book.

14. An apparatus as defined in claim 8, wherein the instructions stored in the memory enable the controller to form a bundle of books including the first primary and secondary books, wherein the recipient address of each book in the bundle of books is associated with the same postal zip code.

15. An article of manufacture comprising a machine-accessible medium having a plurality of machine-accessible instructions that, when executed, cause a machine to:

determine that a first primary book is associated with a first recipient address and a first secondary book is associated with a second recipient address; and deposit the first secondary book via a book feeder on the first primary book at a first book position on a production line.

16. An article of manufacture as defined in claim 15 having the plurality of machine-accessible instructions that, when executed, cause the machine to create a second primary book in a second book position if the second book position is associated with the second primary book.

17. An article of manufacture as defined in claim 15, wherein the first primary book is associated with a first book title, and wherein the first secondary book is associated with a second book title.

18. An article of manufacture as defined in claim 15, wherein the size of the first primary book is different from the size of the first secondary book.

19. An article of manufacture as defined in claim 15 having the plurality of machine-accessible instructions that, when executed, cause the machine to create the first primary book via a saddle stitch binding process.

20. An article of manufacture as defined in claim 15 having the plurality of machine-accessible instructions that, when executed, cause the machine to print personalized information on at least one of the first primary book or the first secondary book.

21. An article of manufacture as defined in claim 15 having the plurality of machine-accessible instructions that, when executed, cause the machine to bundle the first primary and secondary books in a bundle of books associated with the same postal zip code as the first recipient address.

22. A method as defined in claim 1, wherein the depositing of the second book via the book feeder on the first book is performed prior to delivering the first and second books to a stacker.

23. An apparatus as defined in claim 8, wherein the instructions stored in the memory enable the controller to deposit the first secondary book via the book feeder on the first primary book prior to delivering the first primary book and the first secondary book to a stacker.

24. An article of manufacture as defined in claim 15 having the plurality of machine-accessible instructions that, when executed, cause the machine to deposit the first secondary book via a book feeder on the first primary book prior to delivering the first primary book and the first secondary book to a stacker.

* * * * *